US010767716B2

(12) United States Patent
Cavanna

(10) Patent No.: US 10,767,716 B2
(45) Date of Patent: Sep. 8, 2020

(54) ROAD VEHICLE BRAKING SYSTEM WITH FORCED RECIRCULATION OF THE BRAKE LIQUID

(71) Applicant: FERRARI S.p.A., Modena (IT)

(72) Inventor: Martino Cavanna, Formigine (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 15/783,528

(22) Filed: Oct. 13, 2017

(65) Prior Publication Data

US 2018/0106318 A1    Apr. 19, 2018

(30) Foreign Application Priority Data

Oct. 17, 2016  (IT) .................. 102016000103929

(51) Int. Cl.
*F16D 65/853*    (2006.01)
*B60T 13/68*    (2006.01)
(Continued)

(52) U.S. Cl.
CPC .............. *F16D 65/853* (2013.01); *B60T 5/00* (2013.01); *B60T 8/1755* (2013.01);
(Continued)

(58) Field of Classification Search
CPC ........ F16D 65/853; F16D 65/18; F16D 66/00; F16D 2065/782–784; F16D 65/78;
(Continued)

(56) References Cited

U.S. PATENT DOCUMENTS 2,880,823 A   4/1959 Sedergren
4,014,410 A   3/1977 Bryant
(Continued)

FOREIGN PATENT DOCUMENTS

EP    0869293 A1    10/1998
WO    9963244 A1    12/1999
WO    2006066416 A1    6/2006

OTHER PUBLICATIONS

English Abstract of DE Publication No. DE 10349664 A1, published Jun. 2, 2005; 1 page.
(Continued)

*Primary Examiner* — Melody M Burch
(74) *Attorney, Agent, or Firm* — Cantor Colburn LLP

(57) ABSTRACT

A braking system for a road vehicle having: a brake disc; a brake caliper provided with at least one hydraulic piston; a hydraulic circuit containing a brake liquid and having: a hydraulic control unit provided with an electrically controlled pump and a delivery pipe, which connects the hydraulic control unit to the hydraulic piston; a return pipe, which is separate from and independent of the delivery pipe and connects the hydraulic piston to the hydraulic control unit; a recirculation solenoid valve, which is interposed along the return pipe and can be controlled so as to enable or forbid the circulation of the brake liquid along the return pipe; and a control unit, which, when the braking system is not used, opens the recirculation solenoid valve and operates the electrically controlled pump so as to create a circulation of the brake liquid through the first delivery pipe and through the return pipe.

8 Claims, 5 Drawing Sheets

(51) Int. Cl.
*B60T 5/00* (2006.01)
*F16D 65/84* (2006.01)
*F16D 65/78* (2006.01)
*B60T 8/1755* (2006.01)
*B60T 13/66* (2006.01)
*F16D 65/18* (2006.01)
*F16D 66/00* (2006.01)
*F16D 121/04* (2012.01)

(52) U.S. Cl.
CPC .......... *B60T 13/662* (2013.01); *B60T 13/686* (2013.01); *F16D 65/18* (2013.01); *F16D 65/78* (2013.01); *F16D 65/84* (2013.01); *F16D 66/00* (2013.01); *B60Y 2200/114* (2013.01); *F16D 2065/782* (2013.01); *F16D 2065/783* (2013.01); *F16D 2065/784* (2013.01); *F16D 2065/787* (2013.01); *F16D 2066/001* (2013.01); *F16D 2066/006* (2013.01); *F16D 2121/04* (2013.01)

(58) Field of Classification Search
CPC ............... F16D 65/84; F16D 2065/787; F16D 2066/001; F16D 2066/006; F16D 2121/04; B60T 8/1755; B60T 13/686; B60T 13/662; B60T 5/00; B60Y 2200/114

See application file for complete search history.

(56) References Cited

U.S. PATENT DOCUMENTS

| | | | | |
|---|---|---|---|---|
| 4,590,767 | A * | 5/1986 | Gardner, Jr. | F02G 1/04 180/165 |
| 5,397,174 | A * | 3/1995 | Willmann | B60T 8/4872 303/113.2 |
| 5,445,242 | A * | 8/1995 | Pogorzelski | F16D 55/228 188/264 CC |
| 5,630,656 | A * | 5/1997 | Stewart, Jr. | B60T 8/26 188/351 |
| 5,954,166 | A * | 9/1999 | Maeda | B60T 8/32 188/264 F |
| 6,386,333 | B1 | 5/2002 | Russell | |
| 6,648,104 | B1 * | 11/2003 | Buckley | F16D 65/853 188/264 CC |
| 8,833,531 | B2 * | 9/2014 | Richardson | F16D 65/853 188/264 P |

OTHER PUBLICATIONS

English Abstract of DE Publication No. DE10057880 A1, published Nov. 15, 2001; 2 pages.

\* cited by examiner

ROAD VEHICLE BRAKING SYSTEM WITH FORCED RECIRCULATION OF THE BRAKE LIQUID

PRIORITY CLAIM

This application claims priority from Italian Patent Application No. 102016000103929 filed on Oct. 17, 2016, the disclosure of which is incorporated by reference.

TECHNICAL FIELD

The invention relates to a road vehicle braking system.

PRIOR ART

During the braking phase, in the brakes of a road vehicle, the kinetic energy of the road vehicle is converted into heat, which is then disposed of in the external environment. It is important that the temperature of the brakes does not become too high, as an overheating of the brakes can lead to a corresponding overheating of the brake liquid (namely, of the operating liquid of the braking system), which can even "boil" and, hence, lose at least part of its hydraulic features; the overheating of the operating liquid of the braking system is particularly negative, since it determines a loss (which can be significant) of the braking power that can be developed by the braking system and, therefore, determines a condition of extreme danger.

In a high-performance road vehicle, the brakes (especially the front brakes) can require, in some operating situations (typically in case of track driving conditions), an additional cooling in order to avoid the aforesaid overheating; said additional cooling is ensured by special cooling ducts, which originate from air intakes obtained through the body (typically through the front bumper in case of cooling of the front brakes) and end close to the brakes, so as to convey cooling air towards the brakes.

However, it has been proved that the air intakes feeding the brake cooling ducts determine a worsening of the aerodynamic penetration coefficient of the road vehicle, whereas the additional brake cooling ensured by said air intakes is necessary only in particular conditions, which, in the life of the road vehicle, are usually not very frequent.

Patent application DE10349664A1, patent application WO2006066146A1, U.S. Pat. No. 6,386,333B1, and patent application DE10057880A1 describe braking systems with disc brakes for road vehicles, in which there is a hydraulic circuit, which contains a brake liquid and comprises, for each brake caliper, both a delivery pipe and a return pipe, which are used to create a circulation of the brake liquid; the circulation of the brake liquid allows hot brake liquid to be let out of each brake caliper in order to be replaced by cold brake liquid.

DESCRIPTION OF THE INVENTION

The object of the invention is to provide a braking system for a road vehicle, said braking system enabling a significant reduction of the operating temperatures of the brake liquid, without jeopardizing the aerodynamic penetration coefficient of the road vehicle, and being—at the same time—easy and economic to be manufactured.

According to the invention, there is provided a road vehicle braking system according to the appended claims.

BRIEF DESCRIPTION OF THE DRAWINGS

The invention will now be described with reference to the accompanying drawings, which show a non-limiting embodiment thereof, wherein.

PREFERRED EMBODIMENTS OF THE INVENTION

Figure 1:
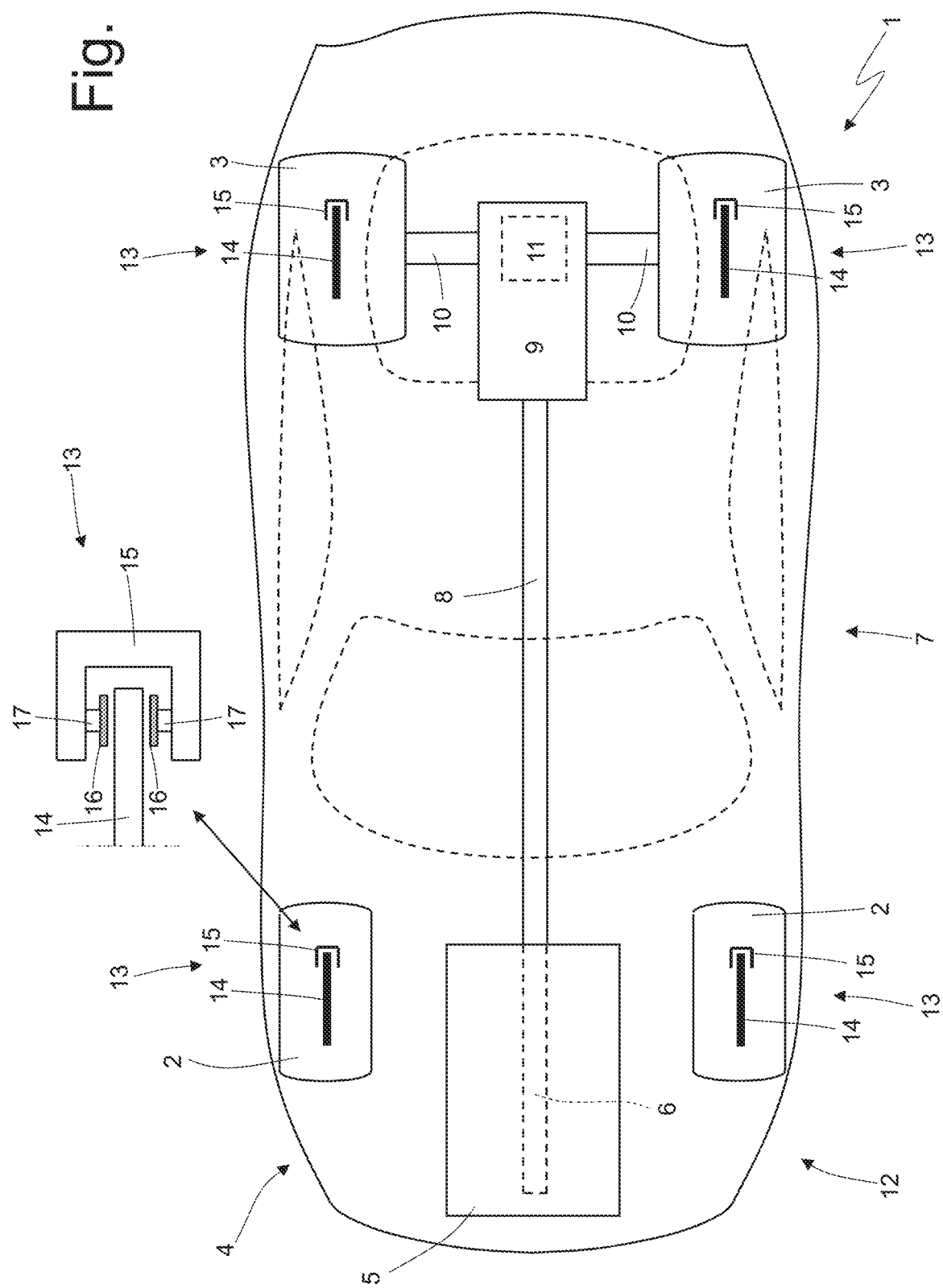
FIG. 1 is a schematic, plan view of a road vehicle provided with a braking system according to the invention.

In FIG. 1, number 1 indicates, as a whole, a road vehicle provided with two front wheels 2 and two rear driving wheels 3, which receive the torque from a powertrain system 4.

The powertrain system 4 comprises an internal combustion heat engine 5, which is arranged in a front position and is provided with a crankshaft 6, and an automatic transmission 7, which transmits the torque generated by the internal combustion engine 5 to the rear driving wheels 3. The transmission 7 comprises a drive shaft 8, which, on one side, is angularly integral to the crankshaft 6 and, on the other side, is mechanically connected to a dual-clutch gearbox 9, which is arranged in a rear position and transmits the motion to the rear driving wheels 3 by means of two axle shafts 10, which receive the motion from a differential 11.

The road vehicle 1 comprises a braking system 12 having four brakes 13, each arranged inside a respective wheel 2 or 3 and mechanically coupled to the wheel 2 or 3. Each brake 13 comprises a brake disc 14, which is angularly integral to the wheel hub, and a brake caliper 15, which is integral to the frame, embraces the brake disc 14, supports a pair of pads 16 made of friction material, and is provided with a series of hydraulic pistons 17, which are controlled so as to simultaneously press, on both sides, the pads 16 against the second brake disc 14.

Figure 2:
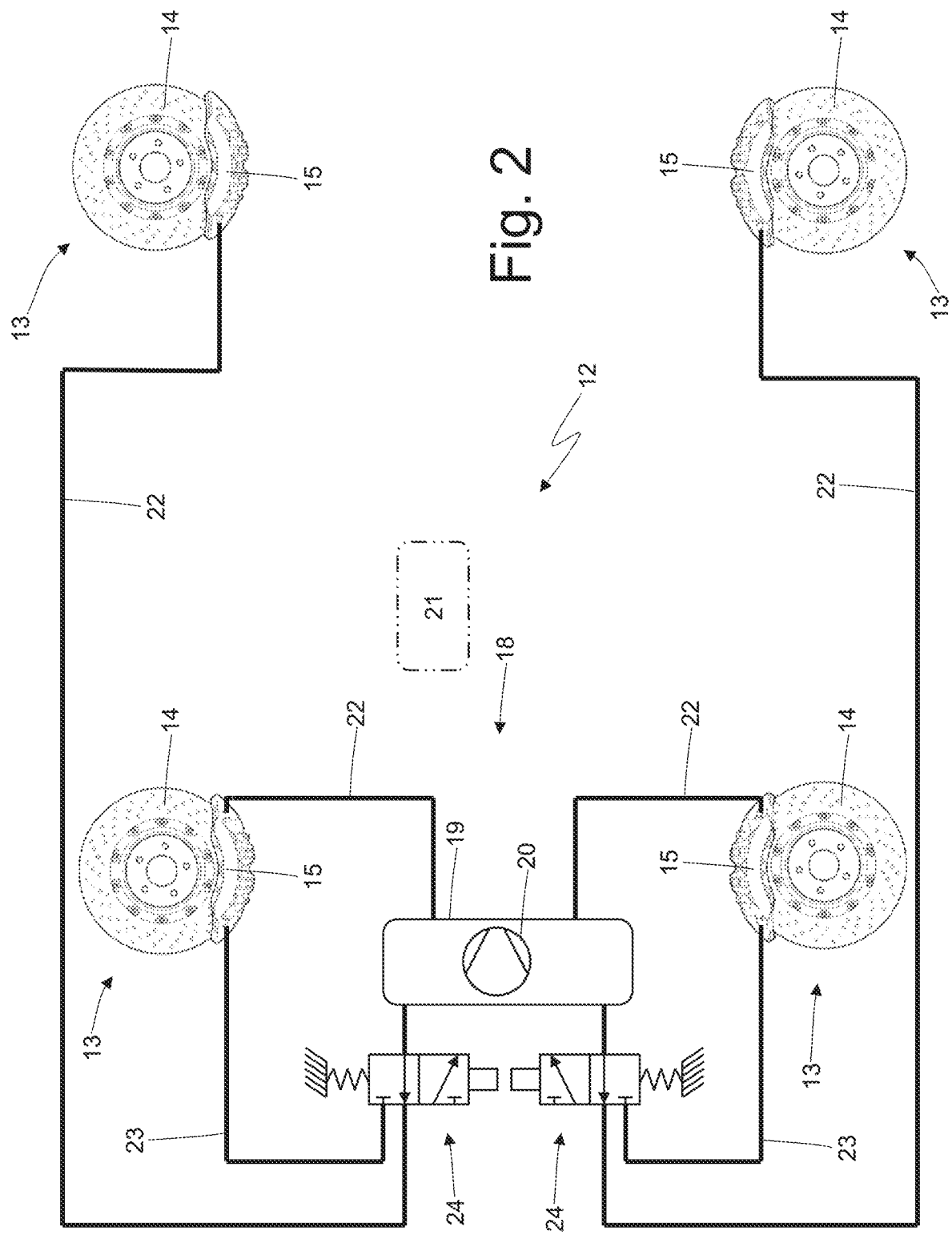
FIG. 2 is a schematic view of the braking system of the road vehicle of FIG. 1.

According to FIG. 2, the braking system 12 comprises a hydraulic circuit 18 containing a brake liquid (namely, an operating liquid of the braking system 12), which is suited to be pressurized in a known manner in order to operate the hydraulic pistons 17 of the brake calipers 15. The hydraulic circuit 18 comprises a control apparatus (which is known and not shown herein) used to pressurize the brake liquid due to the pressure applied on a brake pedal controlled by the driver; the control apparatus comprises a servo-brake and an antilock braking system (also known as ABS, "Antiblockiersystem" in German), which prevents the wheels 2 and 3 from locking, thus making sure that they can be driven while braking.

The hydraulic circuit 18 also comprises a hydraulic control unit 19, which is provided with an electrically controlled pump 20 designed to pressurize the brake liquid independently of the brake pedal and due to the action of an electronic control unit 21; the hydraulic control unit 19 and the electronic control unit 21 are part of an electronic stability control system (also identified by the acronym ESC and also known as ESP from the German "Elektronisches Stabilitätsprogramm", VDC from the English "Vehicle Dynamic Control", VSC from the English "Vehicle Stability Control" and DSC from the English "Dynamic Stability Control"). The electronic stability control system acts when the road vehicle goes into a skid, adjusting the power of the internal combustion engine 5 and braking the single wheels 2 and 3 with different intensities, so as to correct the dynamics of the road vehicle 1, thus stabilizing the attitude of the road vehicle 1.

The hydraulic circuit 18 comprises, for each brake caliper 15, a corresponding delivery pipe 22, which connects the hydraulic control unit 19 to the corresponding hydraulic pistons 17; in other words, each delivery pipe 22 connects the hydraulic control unit 19 to the hydraulic pistons 17 of a corresponding brake caliper 15. According to a preferred embodiment, the delivery pipes 22 are used both by the control apparatus controlled by the brake pedal and by the hydraulic control unit 19; namely, the hydraulic control unit 19 is integrated with the control apparatus controlled by the brake pedal and shares the delivery pipes 22 with the control apparatus.

The hydraulic circuit 18 comprises, for each front brake caliper 15, a return pipe 23, which is separate from and independent of the corresponding delivery pipe 22 and connects the hydraulic pistons 17 of the corresponding brake caliper 15 to the hydraulic control unit 19; in other words, each front brake caliper 15 comprises a delivery pipe 22 and a return pipe 23, which create a close circuit, which enables a circulation of the brake liquid. Preferably, though not necessarily, in each front brake caliper 15, the delivery pipe 22 is connected to a first end of the first brake caliper 15 and the return pipe 23 is connected to a second end of the brake caliper 15, which is opposite the first end. In the embodiment shown in the accompanying drawings, only the front brake calipers 15 (namely, the ones coupled to the front wheels 2) are provided with respective return pipes 23, whereas the rear brake calipers 15 (namely, the ones coupled to the rear wheels 3) are not provided with return pipes 23.

Along each return pipe 23 there is interposed a recirculation solenoid valve 24, which can be controlled by the electronic control unit 21 so as to enable or forbid the circulation of the brake liquid along the return pipe 23.

In the embodiment shown in the accompanying drawings, each recirculation solenoid valve 24 is a three-way valve and intercepts both the corresponding return pipe 23 and a corresponding delivery pipe 22 of a rear brake caliper 15; each three-way recirculation solenoid valve 24 is designed to take on a braking configuration (shown in FIG. 2), in which it seals the corresponding return pipe 23 and connects the corresponding delivery pipe 22 of a rear brake caliper 15 to the hydraulic control unit 19, and a second recirculation configuration (shown in FIG. 3), in which it seals the corresponding delivery pipe 22 of a rear brake caliper 15 and connects the corresponding return pipe 23 to the hydraulic control unit 19.

According to a different embodiment, which is not shown herein (and is not part of the invention), each recirculation solenoid valve 24 is a two-way solenoid valve and solely intercepts the corresponding return pipe 23 (namely, it does not affect in any way the delivery pipes 22 of the rear brake calipers 15); in this embodiment, the hydraulic control unit 19 is physically connected to a pipe for each delivery pipe 22 of the rear brake calipers 15 and is physically connected to a different pipe for each return pipe 23. Furthermore, in this embodiment, each recirculation solenoid valve 24 takes on a braking configuration, in which its seals the corresponding return pipe 23, and a recirculation configuration, in which it allows the brake liquid to flow through the corresponding return pipe 23.

Hereinafter you can find a description of the operation of the braking system 12 with reference to FIGS. 1 and 2.

Usually (as shown in FIG. 2), when the braking system 12 is being used or could be used and, in any case, always, when the temperature of the brake liquid inside the brake calipers 15 is lower than a predetermined intervention threshold (namely, when the brake liquid is relatively cold), the control unit 21 keeps the recirculation solenoid valves 24 in the braking configuration (in which each recirculation solenoid valve 24 seals the corresponding return pipe 23 and connects the corresponding delivery pipe 22 of a rear brake caliper 15 to the hydraulic control unit 19); in this situation, the braking system 12 acts in a totally conventional manner: when the hydraulic control unit 19 increases the hydraulic pressure of the brake liquid along the delivery pipes 22, this hydraulic pressure increase is transmitted to the four brake calipers 15 (two front ones and two rear ones) and, as a consequence, the corresponding pads 16 are locked against the brake discs 14 to carry out a braking action.

When (as you can see in FIG. 3) the temperature of the brake liquid inside the brake calipers 15 exceeds the predetermined intervention threshold (namely, when the brake liquid is hot) and, at the same time, when the braking system 12 is not being used and should not be used soon, the control unit 21 places (very briefly, namely for a limited amount of time that is not greater than fractions of a second) the recirculation solenoid valves 24 in the recirculation configuration (in which each recirculation solenoid valve 24 seals the corresponding delivery pipe 22 of a rear brake caliper 15 and connects the corresponding return pipe 23 to the hydraulic control unit 19) and simultaneously operates the electrically controlled pump 20 at the maximum flow rate, so as to create a circulation of the brake liquid through the delivery pipes 22 of the front brake calipers 15 and through the return pipes 23. In other words, when the recirculation solenoid valves 24 are in the recirculation configuration, the return pipes 23 are connected to the hydraulic control unit 19 and, therefore, when the electrically controlled pump 20 pressurized the brake liquid in the front brake calipers 15, this pressure does not determine an operation of the front brake calipers 15, but it determines a circulation of the brake liquid through the return pipes 23 (as indicated by the arrows of FIG. 2). In this way, the very hot brake liquid present inside the front brake calipers 15 flows out of the front brake calipers 15 and is replaced by cooler brake liquid coming from the hydraulic control unit 19; therefore, the mean temperature of the brake liquid in the front brake calipers 15 is significantly lowered, thus avoiding the risk of the brake liquid reaching its boiling point.

It should be pointed out that, when the recirculation solenoid valves 24 are in the recirculation configuration, the operation of the electrically controlled pump 20 pressurizing the brake liquid does not affect the rear brake calipers 15, as the delivery pipes 22 of the rear brake calipers 15 are hydraulically isolated from the hydraulic control unit 19 due to the action of the recirculation solenoid valves 24. In case the recirculation solenoid valves 24 are two-way solenoid valves and do not seal the delivery pipes 22 of the rear brake calipers 15 in the recirculation configuration, you need to act upon the actuators of the antilock system in order to prevent the operation of the electrically controlled pump 20, which pressurizes the brake liquid, from determining a braking of the rear brakes 13 during the recirculation of the brake liquid so as to lower the temperature of the brake liquid inside the front brake calipers 15.

According to a preferred embodiment, the control unit 21 indirectly estimates the temperature of the brake liquid inside the front brake calipers 15. This estimation involves calculating, for each deceleration of the road vehicle 1 determined by the action of the braking system 12, the kinetic energy differential of the road vehicle 1 caused by the deceleration; the estimation of the temperature reached by the brake liquid inside the front brake calipers 15 during the deceleration being determined, by means of suitable experimental maps, based on the kinetic energy differential and taking into account a starting temperature of the brake liquid inside the front brake calipers 15 before the deceleration. According to an alternative embodiment, the control unit 21 directly measures the temperature of at least one front brake disc 14 (usually by means of an infrared temperature sensor which is "aimed" at the front brake disc 14 and measures the temperature without contact) and, from the temperature of the front brake disc 14, it determines the temperature of the brake liquid inside the corresponding front brake caliper 15.

By way of example, the control unit 21 could identify the moments in which the braking system 12 should bot be used soon based on the position of the accelerator pedal: when the accelerator pedal is pressed beyond a given predetermined use threshold (for example 60% of its stroke), then it is highly unlikely that the braking system 12 will be used soon. As a consequence, the control unit 21 identifies the moments in which the braking system 12 should not be used soon, when the following two conditions occur simultaneously: the brake pedal is not pressed and the accelerator pedal is pressed beyond 60% of its stroke; according to a further embodiment, the control unit 21 identifies the moments in which the braking system 12 should not be used soon, when the following four conditions occur simultaneously: the brake pedal is not pressed, the accelerator pedal is pressed beyond 60% of its stroke, the speed of the road vehicle 1 exceeds 20 km/h, and there are no interventions of electronic driving assistance systems (namely, of the antilock braking system, of the electronic stability control system and of other similar electronic systems).

In the embodiment shown in FIGS. 1 and 2, when the braking system 12 is not used, the control unit 21 operates the electrically controlled pump 20 so as to create a circulation of the brake liquid into each front brake caliper 15 through the corresponding delivery pipe 22 and out of the front brake caliper 15 through the corresponding return pipe 23.

Figure 3:
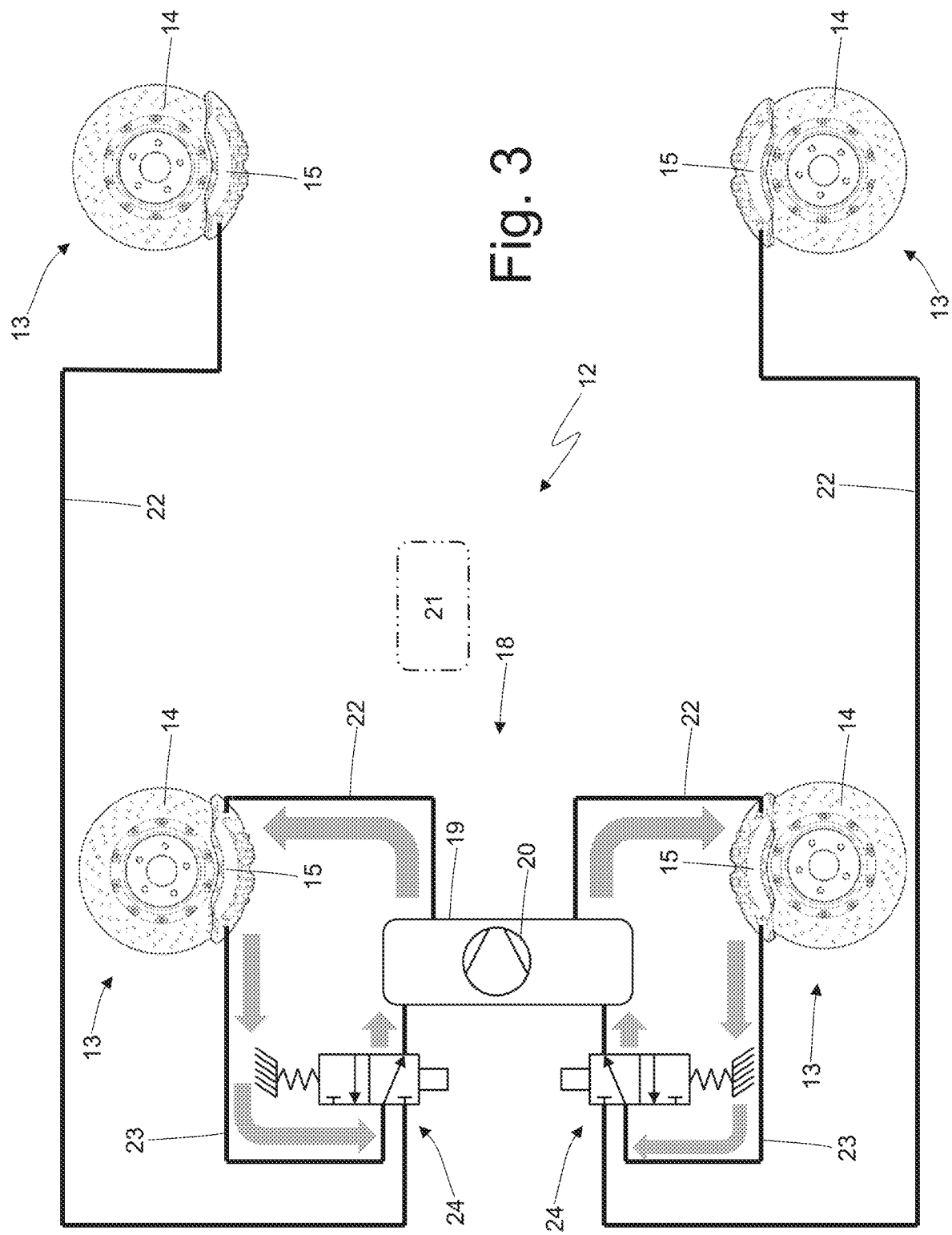
FIG. 3 is a schematic view of the braking system of FIG. 2 during a recirculation of the braking liquid.
Figure 4:
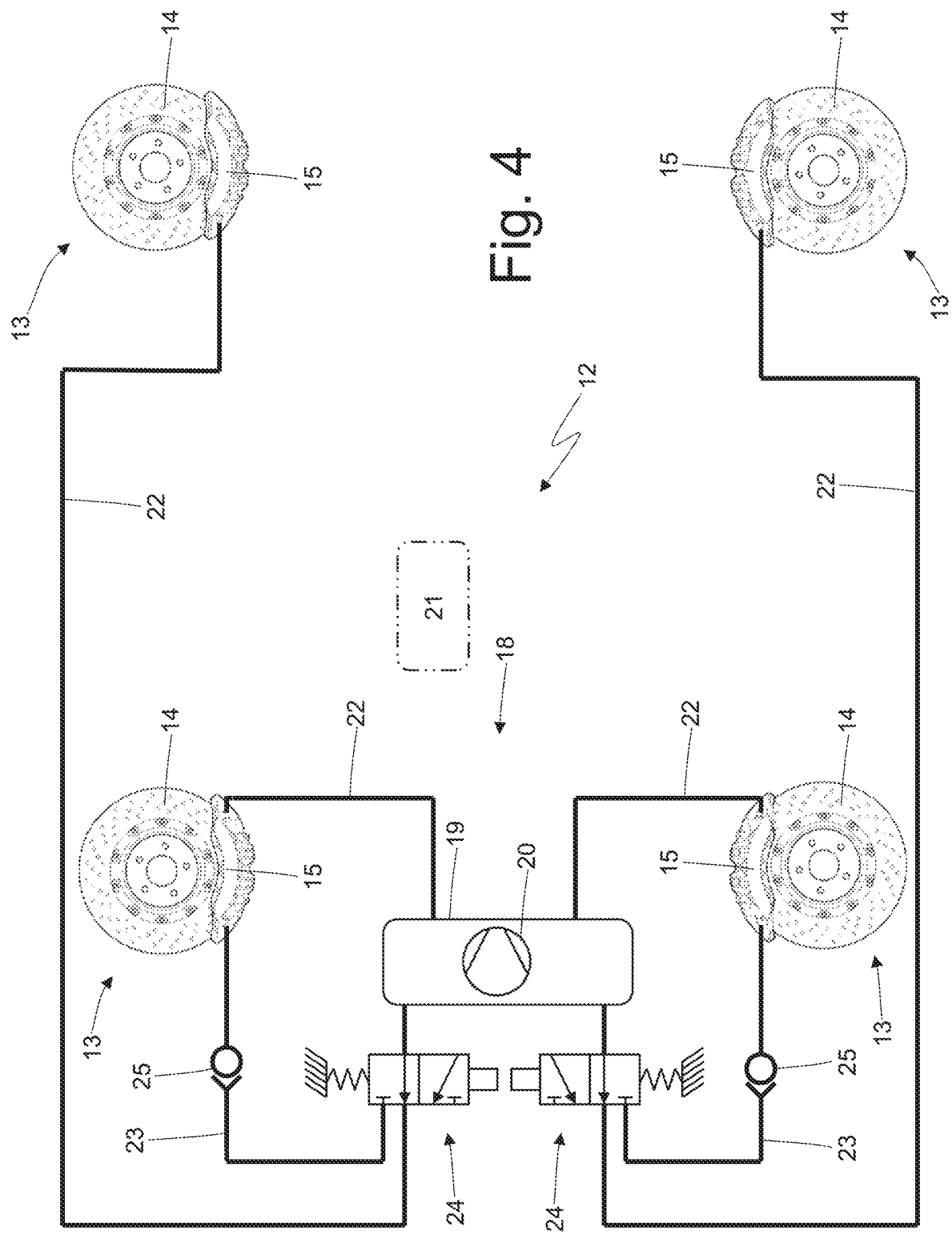
FIG. 4 is a schematic view of a variant of the braking system of the road vehicle of FIG. 1.
Figure 5:
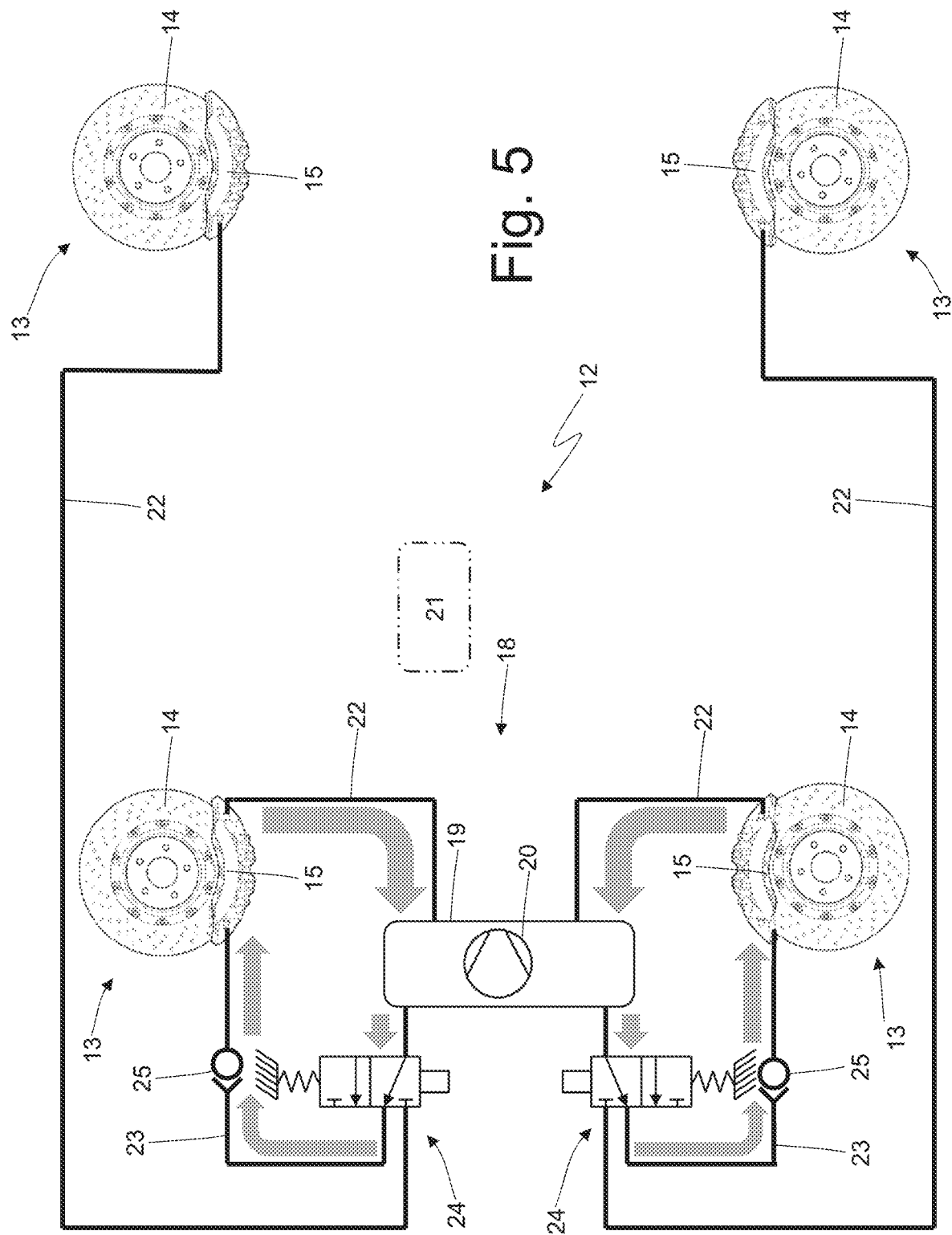
FIG. 5 is a schematic view of the braking system of FIG. 4 during a recirculation of the braking liquid.

In the alternative embodiment shown in FIGS. 3 and 4, when the braking system 12 is not used, the control unit 21 operates the electrically controlled pump 20 so as to create a circulation of the brake liquid into each front brake caliper 15 through the corresponding return pipe 23 and out of the front brake caliper 15 through the corresponding delivery pipe 22. In other words, in the embodiment shown in FIGS. 3 and 4, the direction of circulation of the brake liquid is reversed compared to the embodiment shown in FIGS. 1 and 2.

In the embodiment shown in FIGS. 3 and 4, non-return valves 25 can be provided, each interposed along a corresponding return pipe 23 upstream of the recirculation solenoid valve 24 relative to the brake caliper 15 and forbidding the circulation of the brake liquid through the return pipe 23 out of the brake caliper 15. In other words, each non-return valve 25 is arranged along a corresponding return pipe 23 between the recirculation solenoid valve 24 and the brake caliper 15 and forbids the circulation of the brake liquid through the return pipe 23 out of the brake caliper 15. When the braking system 12 is used in the traditional way (namely, to brake the road vehicle 1), the pressure exerted upon the front brake calipers 15 is released onto (namely, is held by) the non-return valves 25 and does not reach the recirculation solenoid valves 24 (unlike the embodiment shown in FIGS. 1 and 2, in which, as there are no non-return valves 25, the pressure exerted upon the front brake calipers 15 is released onto the recirculation solenoid valves 24); by so doing, in the embodiment shown in FIGS. 3 and 4, the recirculation solenoid valves 24 do not have to resist the pressure exerted upon the front brake calipers 15 during the braking and, therefore, can be manufactured in a simpler and more economic manner.

In the embodiment shown in the accompanying drawings, the recirculation of the brake liquid to lower the temperature of the brake liquid inside the brake calipers 15 is used only for the front brake calipers 15, which are more stressed by the braking and, therefore, are more subjected to a high heating. According to an alternative and perfectly equivalent embodiment, which is not shown herein, the recirculation of the brake liquid to lower the temperature of the brake liquid inside the brake calipers 15 could also be used for the rear brake calipers 15.

In the embodiment shown in the accompanying drawings, the road vehicle 1 is a car provided with four wheels 2 and 3. According to an alternative and perfectly equivalent embodiment, which is not shown herein, the road vehicle is a motorcycle provided with only two wheels. According to an alternative and perfectly equivalent embodiment, which is not shown herein, the road vehicle is a truck with four or more wheels.

The braking system 12 described above has numerous advantages.

First of all, the braking system 12 described above permits a significant reduction of the temperature of the brake liquid inside the brake calipers 15 without using brake cooling ducts, namely without jeopardizing the aerodynamic penetration coefficient of the road vehicle 1. Indeed, the circulation of the brake liquid allows the hot brake liquid to flow out of the brake calipers 15 in order to be replaced by cooler brake liquid coming from the hydraulic control unit 19. In a simulation made in the Fiorano Circuit, it was calculated that the recirculation of the brake liquid of the front brake calipers 15 could take place eight times per lap (i.e. eight actuations every lap) with a duration of 20 msec for each recirculation (the electropump 19 has a maximum flow rate of approximately 10-15 cc/sec); in this way, the mean temperature of the brake liquid of the front brake calipers 15 could be reduced by approximately 20-30° C. with no need for additional ventilation.

Furthermore, the braking system 12 described above is simple and economic to be manufactured, as, compared to a known similar braking system, it only requires the addition of two recirculation pipes 23 and of two recirculation solenoid valves 24.

The invention claimed is:

1. A braking system (12) for a road vehicle (1); the braking system (12) comprises:
    a first brake disc (14);
    a second brake disc (14);
    a first brake caliper (15), which embraces the first brake disc (14), supports a pair of first pads (16) made of friction material, and is provided with at least one first hydraulic piston (17), which can be operated so as to simultaneously press, on both sides, the first pads (16) against the first brake disc (14);
    a second brake caliper (15), which embraces the second brake disc (14), supports a pair of second pads (16) made of friction material, and is provided with at least one second hydraulic piston (17), which can be operated so as to simultaneously press, on both sides, the second pads (16) against the second brake disc (14);

a hydraulic circuit (18) containing a brake liquid, which is suited to be pressurized so as to operate the at least one first hydraulic piston (17) and the at least one second hydraulic piston (17), and comprising a hydraulic control unit (19), which is provided with an electrically controlled pump (20) designed to pressurize the brake liquid;

a first delivery pipe (22), which connects the hydraulic control unit (19) to the at least one first hydraulic piston (17) of the first brake caliper (15);

a second delivery pipe (22), which connects the hydraulic control unit (19) to the at least one second hydraulic piston (17) of the second brake caliper (15);

a return pipe (23), which is separate from and independent of the first delivery pipe (22) and connects the at least one first hydraulic piston (17) of the first brake caliper (15) to the hydraulic control unit (19);

a recirculation solenoid valve (24), which is interposed along the return pipe (23) and can be controlled so as to enable or forbid the circulation of the brake liquid along the return pipe (23); and a control unit (21), which controls the recirculation solenoid valve (24) so as to normally forbid the circulation of the brake liquid along the return pipe (23) and, when the first and second hydraulic pistons (17) are not used to press first and second pads (16) against the first and second brake discs (14), respectively, for generating a braking force, controls the recirculation solenoid valve (24) so as to enable the circulation of the brake liquid along the return pipe (23) and operates the electrically controlled pump (20) so as to create a circulation of the brake liquid through the first delivery pipe (22) and through the return pipe (23);

wherein the second brake caliper (15) is not provided with a return pipe (23); and wherein the recirculation solenoid valve (24) is a three-way valve, intercepts the return pipe (23) and the second delivery pipe (22), and is designed to take on a first braking configuration, in which it seals the return pipe (23) and connects the second delivery pipe (22) to the hydraulic control unit (19), and a second recirculation configuration, in which it seals the second delivery pipe (22) and connects the return pipe (23) to the hydraulic control unit (19).

2. A braking system (12) according to claim 1, wherein the first delivery pipe (22) is connected to a first end of the first brake caliper (15) and the return pipe (23) is connected to a second end of the first brake caliper (15), which is opposite the first end.

3. A braking system (12) according to claim 1, wherein, when the first and second hydraulic pistons (17) are not used to press first and second pads (16) against the first and second brake discs; (14) respectively, for generating a braking force, the control unit (21) operates the electrically controlled pump (20) so as to create a circulation of the brake liquid into the first brake caliper (15) through the first delivery pipe (22) and out of the first brake caliper (15) through the return pipe (23).

4. A braking system (12) according to claim 1, wherein, when the first and second hydraulic pistons (17) are not used to press first and second pads (16) against the first and second brake discs (14), respectively, for generating a braking force, the control unit (21) operates the electrically controlled pump (20) so as to create a circulation of the brake liquid into the first brake caliper (15) through the return pipe (23) and out of the first brake caliper (15) through the first delivery pipe (22).

5. A braking system (12) according to claim 4 and further comprising a non-return valve (25), which is interposed along the return pipe (23) upstream of the recirculation solenoid valve (24) relative to the first brake caliper (15) and forbids the circulation of the brake liquid through the return pipe (23) when and only when the brake liquid flows from the first brake caliper (15) towards the non-return valve (25).

6. A braking system (12) according to claim 1, wherein the first brake disc (14) can be connected to a front wheel (2) and the second brake disc (14) can be connected to a rear wheel (3).

7. A braking system (12) according to claim 1, wherein the hydraulic control unit (19) is part of a system for the electronic stability control of the road vehicle (1).

8. A braking system (12) for a road vehicle (1); the braking system (12) comprises:
a first brake disc (14);
a second brake disc (14);
a first brake caliper (15), which embraces the first brake disc (14), supports a pair of first pads (16) made of friction material, and is provided with at least one first hydraulic piston (17), which can be operated so as to simultaneously press, on both sides, the first pads (16) against the first brake disc (14);
a second brake caliper (15), which embraces the second brake disc (14), supports a pair of second pads (16) made of friction material, and is provided with at least one second hydraulic piston (17), which can be operated so as to simultaneously press, on both sides, the second pads (16) against the second brake disc (14);
a hydraulic circuit (18) containing a brake liquid, which is suited to be pressurized so as to operate the at least one first hydraulic piston (17) and the at least one second hydraulic piston (17), and comprising a hydraulic control unit (19), which is provided with an electrically controlled pump (20) designed to pressurize the brake liquid;
a first delivery pipe (22), which connects the hydraulic control unit (19) to the at least one first hydraulic piston (17) of the first brake caliper (15);
a second delivery pipe (22), which connects the hydraulic control unit (19) to the at least one second hydraulic piston (17) of the second brake caliper (15);
a return pipe (23), which is separate from and independent of the first delivery pipe (22) and connects the at least one first hydraulic piston (17) of the first brake caliper (15) to the hydraulic control unit (19);
a recirculation solenoid valve (24), which is interposed along the return pipe (23) and can be controlled so as to enable or forbid the circulation of the brake liquid along the return pipe (23);
a control unit (21), which controls the recirculation solenoid valve (24) so as to normally forbid the circulation of the brake liquid along the return pipe (23) and, when the first and second hydraulic pistons (17) are not used to press pads (16) against the first and second brake discs (14), respectively, for generating a braking force, controls the recirculation solenoid valve (24) so as to enable the circulation of the brake liquid along the return pipe (23) and operates the electrically controlled pump (20) so as to create a circulation of the brake liquid through the first delivery pipe (22) and through the return pipe (23); and
a non-return valve (25), which is interposed along the return pipe (23) upstream of the recirculation solenoid valve (24) relative to the first brake caliper (15) and forbids the circulation of the brake liquid through the return pipe (23) when and only when the brake liquid flows from the first brake caliper (15) towards the non-return valve (25);

wherein the second brake caliper (15) is not provided with a return pipe (23);

wherein the recirculation solenoid valve (24) is a three-way valve, intercepts the return pipe (23) and the second delivery pipe (22), and is designed to take on a first braking configuration, in which it seals the return pipe (23) and connects the second delivery pipe (22) to the hydraulic control unit (19), and a second recirculation configuration, in which it seals the second delivery pipe (22) and connects the return pipe (23) to the hydraulic control unit (19), wherein, when the first and second hydraulic pistons (17) are not used to press pads (16) against the brake disc (14) for generating a braking force, the control unit (21) operates the electrically controlled pump (20) so as to create a circulation of the brake liquid into the first brake caliper (15) through the return pipe (23) and out of the first brake caliper (15) through the first delivery pipe (22).

\* \* \* \* \*